United States Patent
Jung (10) Patent No.: US 8,872,482 B2
(45) Date of Patent: Oct. 28, 2014

(54) BATTERY PACK AND ACTIVE CELL BALANCING BATTERY MANAGEMENT SYSTEM INCLUDING THE SAME

(75) Inventor: Eun-Ey Jung, Paju (KR)

(73) Assignee: Eun-Ey Jung, Paju (KR)

( * ) Notice: Subject to any disclaimer, the term of this patent is extended or adjusted under 35 U.S.C. 154(b) by 776 days.

(21) Appl. No.: 12/745,138

(22) PCT Filed: Apr. 30, 2010

(86) PCT No.: PCT/KR2010/002773
§ 371 (c)(1),
(2), (4) Date: May 27, 2010

(87) PCT Pub. No.: WO2011/065639
PCT Pub. Date: Jun. 3, 2011

(65) Prior Publication Data
US 2012/0032638 A1    Feb. 9, 2012

(30) Foreign Application Priority Data

| Nov. 30, 2009 | (KR) | 10-2009-0117165 |
| Jan. 25, 2010 | (KR) | 10-2010-0006630 |
| Feb. 11, 2010 | (KR) | 10-2010-0012741 |
| Apr. 13, 2010 | (KR) | 10-2010-0033934 |

(51) Int. Cl.
*H01M 10/46* (2006.01)

(52) U.S. Cl.
USPC ............................................. 320/138

(58) Field of Classification Search
USPC .......... 429/149–159; 320/107, 112, 116, 118, 320/138, 150, 153
See application file for complete search history.

(56) References Cited

U.S. PATENT DOCUMENTS 5,198,638 A * 3/1993 Massacesi ............... 219/209
5,608,306 A * 3/1997 Rybeck et al. ............ 320/106

(Continued)

FOREIGN PATENT DOCUMENTS

| CN | 101051682 | 10/2007 |
| CN | 101088202 | 12/2007 |

(Continued)

OTHER PUBLICATIONS

International Search Report for Application No. PCT/KR2010/002773, mailed Dec. 6, 2010, 9 pages.

(Continued)

*Primary Examiner* — Edward Tso
(74) *Attorney, Agent, or Firm* — Sheridan Ross PC (57) ABSTRACT

The present invention discloses a battery pack which can be used for an electric vehicle, an Uninterrupted Power Supply (UPS), and a power supply for a smart grid and which can be easily manufactured and repaired and which is capable of improving productivity, the span of life, and performance, and a battery management system including the battery pack.

The battery pack of the present invention comprises a casing in which a reception space is provided and battery modules coupled to the casing at regular intervals by fastening members so that the battery modules can be easily dismantled from the casing. Each of the battery modules includes a tray, a battery cell provided in the tray, a cell charger provided in the tray and configured to charge the battery cell, a cell controller provided in the tray and configured to control the cell charger, a heating mat coupled to the battery cell, and a temperature sensor provided in the tray and configured to sense a temperature of the battery cell.

20 Claims, 7 Drawing Sheets

(56) References Cited

U.S. PATENT DOCUMENTS

| | | | |
|---|---|---|---|
| 7,821,230 B2* | 10/2010 | Studyvin et al. | 320/119 |
| 8,129,950 B2* | 3/2012 | Colin et al. | 320/134 |
| 2006/0108956 A1* | 5/2006 | Clark et al. | 318/139 |
| 2007/0238018 A1 | 10/2007 | Lee et al. | |
| 2010/0021802 A1* | 1/2010 | Yang et al. | 429/91 |

FOREIGN PATENT DOCUMENTS

| | | |
|---|---|---|
| JP | H07-008949 | 1/1995 |
| JP | 2001-015090 | 1/2001 |
| JP | 2005-243580 | 9/2005 |
| JP | 2008-047371 | 2/2008 |
| JP | 2009-238538 | 10/2009 |
| KR | 1020040045937 A | 6/2004 |
| KR | 10-2006-0073524 A | 6/2006 |
| KR | 10-0660728 B1 | 12/2006 |
| KR | 1020070064878 A | 6/2007 |
| KR | 10-2007-0100555 A | 10/2007 |
| WO | WO 2006/068430 A1 | 6/2006 |
| WO | WO 2009/118963 | 10/2009 |

OTHER PUBLICATIONS

Official Action for Chinese Patent Application No. 201080001232.9, dated Nov. 1, 2012, 8 pages.
Official Action for Japan Patent Application No. 2011-543449, dated Aug. 30, 2012, 4 pages.

* cited by examiner

BATTERY PACK AND ACTIVE CELL BALANCING BATTERY MANAGEMENT SYSTEM INCLUDING THE SAME

CROSS-REFERENCE TO RELATED APPLICATION

This application claims priority to and the benefit of Korean Patent Application Nos. 10-2009-0117165, 10-2010-0006630, 10-2010-0012741, and 10-2010-0033934 filed in the Korean Intellectual Property Office on Nov. 30, 2009, Jan. 25, 2010, Feb. 11, 2010, and Apr. 13, 2010, the entire contents of which are incorporated herein by reference.

BACKGROUND OF THE INVENTION (a) Field of the Invention

The present invention relates to a battery pack and a battery management system including the same. More particularly, the present invention relates to a battery pack which can be used for an electric vehicle, an Uninterrupted Power Supply (UPS), and a power supply for a smart grid and which can be easily manufactured and repaired and which is capable of improving productivity, the span of life, and performance, and a battery management system including the battery pack.

(b) Description of the Related Art

In general, a charging battery can be used as a driving source for an electric vehicle and as an UPS which can supply a stable power by overcoming a power failure which can occur in a common power. The battery can also be used as a power supply for a smart grid.

The battery has a battery pack type in which a plurality of battery cells is integrally interconnected depending on its capacity.

In the existing battery pack, when the battery pack is charged, the cells constituting the battery 혝 are coupled in series or in parallel and then charged through one charger, and a deviation between the cells is manually managed. Accordingly, the existing battery pack is problematic in that the life span of the battery pack is reduced because of the deviation.

Further, the existing battery pack has an assembly type in which each of the battery cells cannot be separated from the battery pack. Accordingly, there are problems in that if any one of the battery cells is faulty, the entire battery pack cannot be used, the life span is shortened, and a waste of resources is increased.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a battery pack and an active cell-balancing battery management system including the same, having advantages of preventing deterioration in the performance of the battery pack and a reduction in the life span due to a deviation between cells in such a way as to connect a charger to each of the cells and to actively manage the deviation between the cells by individually managing the charging of the cells.

Further, the present invention has been made to provide a battery pack in which battery cells constituting the battery pack are fabricated in a replacement form, thereby enabling easy maintenance and repair and being capable of increasing the life span of the battery pack, and a battery management system including the battery pack.

Further, the present invention has been made to provide a battery pack in which a cell grading process can be omitted from a process of manufacturing battery cells, thereby being capable of simplifying a battery pack manufacture process and reducing the production cost, and a battery management system including the battery pack.

Further, the present invention has been made to provide a battery pack having a structure in which battery cells can be individually charged, thereby being capable of preventing charging imbalance in the battery cells which can occur in a conventional serial charging method or passive cell-balancing method, of increasing the life span of the battery pack, and of maximizing an available capacity of the battery pack, and a battery management system including the battery pack.

An exemplary embodiment of the present invention provides a battery pack, comprising a casing configured to include a reception space, trays coupled to the casing at regular intervals, battery cells provided in the respective trays, cell chargers respectively configured to charge the battery cells and provided in the trays, cell controllers respectively provided in the trays and configured to control the cell chargers, heating mats coupled to the respective battery cells, and temperature sensors respectively provided in the trays and configured to sense temperatures of the battery cells.

The casing preferably is equipped with guide slots having faced each other in pairs at regular intervals and having the trays fit and inserted into the guide slots. The trays each preferably are equipped with extension portions, the extension portions provided on both sides of the tray and inserted into the guide slots.

The trays each preferably are fastened to the casing using fastening members.

The cell controllers preferably are equipped with a communication connector connected to a main controller and configured to exchange data with the main controller.

Further, the present invention provides a battery management system, comprising:

a battery pack, comprising a casing configured to include a reception space, trays coupled to the casing at regular intervals, battery cells provided in the respective trays, cell chargers respectively configured to charge the battery cells and provided in the trays, cell controllers respectively provided in the trays and configured to control the cell chargers, heating mats coupled to the respective battery cells, and temperature sensors respectively provided in the trays and configured to sense temperatures of the battery cells; and a main controller comprising a charging control module for receiving information about a state of charge (SOC) of each of the battery cells from the cell controllers and for controlling each of the cell chargers.

The main controller preferably further comprises a temperature control module for receiving signals corresponding to values measured by the temperature sensors and for controlling heating mats or a cooling fan for controlling a temperature of the battery cells.

The main controller preferably further comprises a battery cell protection control module connected to a current sensor for sensing currents of the battery cells and a current breaking switch for breaking the currents of the battery cells and configured to control the current breaking switch based on a signal received from the current sensor.

The main controller preferably further comprises a cell grading control module configured to perform cell grading for determining an inappropriate battery cell by determining a state of charge (SOC) and a state of health (SOH) of each of the battery cells in response to each of signals received from the cell controllers.

The cell grading control module preferably is further configured to determine the remaining life span of the battery cell by determining a state of charge (SOC) and a state of health (SOH) of each of the battery cells based on the signal received from the cell controller.

The main controller preferably comprises a communication control module configured to send data pertinent to the battery cells, received from the cell controllers, and data processed in relation to the data, received from the cell controllers, to an external memory and to communicate the data to an external computer.

The main controller preferably comprises a CAN communication port, a TCP/IP communication port, and a USB communication port.

Internal memories preferably are connected to the respective cell controllers, and the main controller preferably comprises a history management control module for recording histories of the battery cells in the respective internal memories and managing the histories.

In accordance with the exemplary embodiments of the present invention, the battery pack is configured to easily replace a battery module including a run-down or abnormal battery cell. Accordingly, there are advantages in that the maintenance and repair of the battery pack is facilitated and the general life span of the battery pack can be prolonged.

Further, in accordance with the exemplary embodiments of the present invention, a battery module including an inappropriate battery cell is replaced with a battery module including a new battery cell by performing battery cell grading for determining a state of charge (SOC), a state of health (SOH), etc. of each of the battery cells by measuring the capacity, internal resistance, etc. of each of the battery cells constituting the battery pack. Accordingly, there are advantages in that a process of manufacturing the battery cells can be simplified and productivity can be improved because a grading task for the battery cells performed in a process of manufacturing the battery cells can be omitted.

Further, in accordance with the exemplary embodiments of the present invention, the battery cells can be independently charged based on the characteristic of each battery cell. Accordingly, there are advantages in that a charging imbalance state of the battery cells can be prevented, the life span of the battery pack can be prolonged, and an available capacity of the battery pack can be maximized.

In the exemplary embodiments of the present invention, an active cell-balancing method is performed. Accordingly, a charging imbalance problem due to the imbalance of battery cells in a battery management apparatus adopting a conventional passive cell-balancing method is not generated.

Further, in the exemplary embodiments of the present invention, a cell having a high or low capacity is used without changing battery equipment according to a necessary capacity. Accordingly, there is an advantage in that a battery pack easily dealing with use environments can be supplied because the capacity of the battery pack can be simply changed.

DETAILED DESCRIPTION OF THE EMBODIMENTS

Hereinafter, some exemplary embodiments of the present invention are described in detail with reference to the accompanying drawings.

Figure 1:
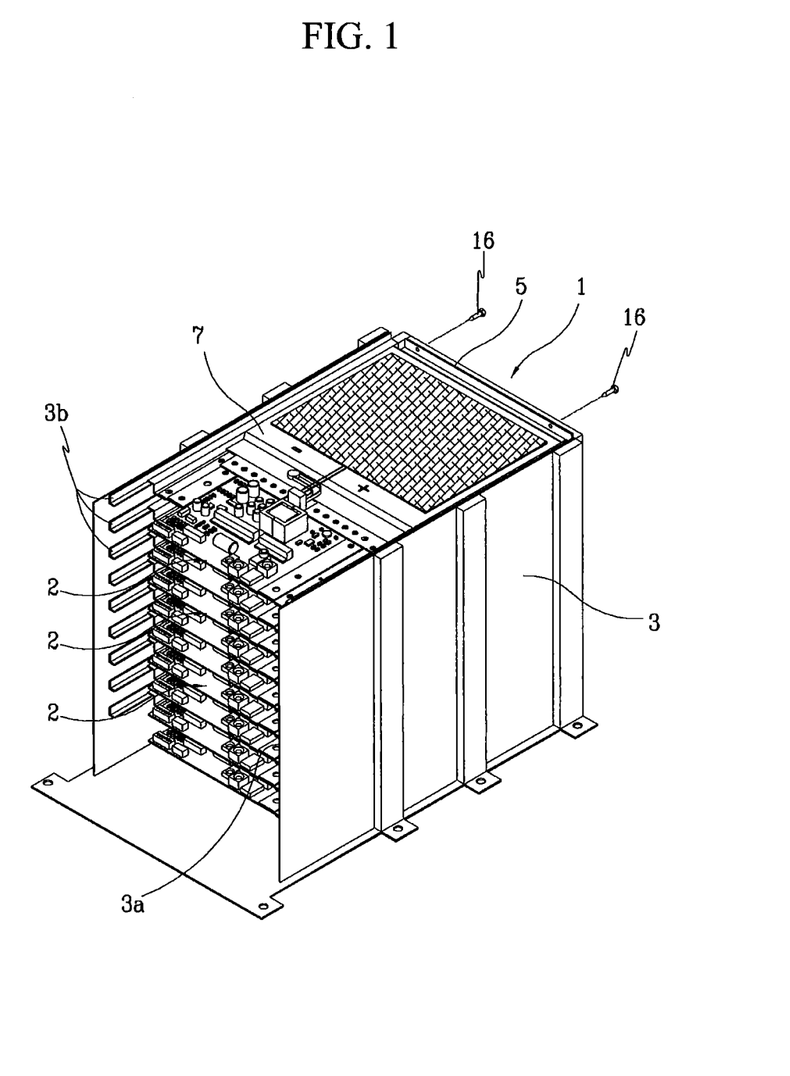
FIG. 1 is a perspective view showing a battery pack of a state in which a plurality of battery modules is coupled together in order to describe an exemplary embodiment of the present invention.
Figure 2:
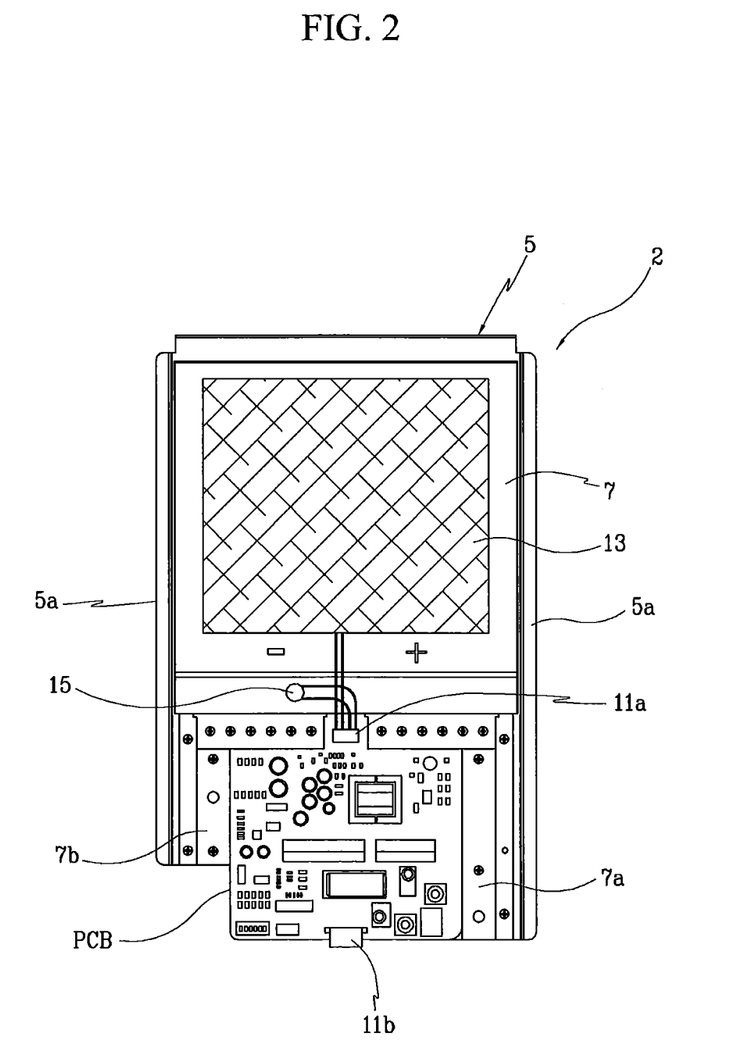
FIG. 2 is a perspective view showing a battery module including a battery cell in order to describe an exemplary embodiment of the present invention.

FIG. 1 is a perspective view illustrating an exemplary embodiment of the present invention and shows a battery pack 1. Further, FIG. 2 is a diagram showing one of battery modules 2 constituting the battery pack 1.

In a description relating to the exemplary embodiment of the present invention, it is assumed that the battery module 2 (refer to FIG. 2) forms a basic unit capable of supplying a power source and a number of the battery modules 2, coupled together at regular intervals so that they can be dismantled and assembled in a casing 3 (refer to FIG. 1), form the battery pack 1.

Meanwhile, the battery module 2 preferably includes a tray 5, a battery cell 7, a cell charger 9, a cell controller 11, a heating mat 13, and a temperature sensor 15 as one set.

Further, in the exemplary embodiment of the present invention, the battery modules 2 preferably are configured to be easily assembled in the casing 3 using fastening members 16 (refer to FIG. 1), such as screws, and to be easily replaced in the casing 3 as occasion demands. The exemplary embodiment of the present invention is described in more detail below.

The casing 3 includes a reception space in which the battery modules 2 can be accommodated. The casing 3 further includes an opening 3a having one face opened. A plurality of guide slots 3b is formed in the opposite sides of the casing 3 (both internal faces on the basis of the front face of FIG. 2).

The trays 5 are inserted into the guide slots 3b, provided in the opposite internal faces of the casing 3, at regular intervals. The guide slots 3b are disposed at regular intervals in a certain direction. The trays 5 inserted into the guide slots 3b are stacked in a certain direction.

Each of the trays 5 has extension portions 5a on its both sides. The extension portions 5a are inserted into the guide slots 3b. That is, the extension portions 5a are inserted into the guide slots 3b provided in the casing 3. Further, the trays 5 can be robustly fastened to the casing 3 using the fastening members 16, such as screws.

The trays 5 are fastened to the casing 3 using the fastening members 16, such as screws, so that the battery module 2 can be easily detached from the casing 3 when the corresponding battery module 2 is defective or run down and a new battery module 2 can be easily coupled to the casing 3 by unfastening the fastening members 16, such as screws.

Since the trays 3 and the casing 3 are coupled together by the fastening members 16 such as screws, the maintenance and repair of the battery pack 1 is facilitated, and the life span of the battery pack 1 can be prolonged.

The battery cells 7 are provided in the respective trays 5. The battery cells 7 are charged with a power source and so they can supply a power source externally. The battery cell 7 is coupled to the tray 5. The battery cell 7 includes terminals 7a and 7b connecting an electrode of a negative polarity and an electrode of a positive polarity. The terminals 7a and 7b can be used to drain a power source, charged in the battery cell 7, externally or to charge the battery cell 7 with a power source.

Figure 3:
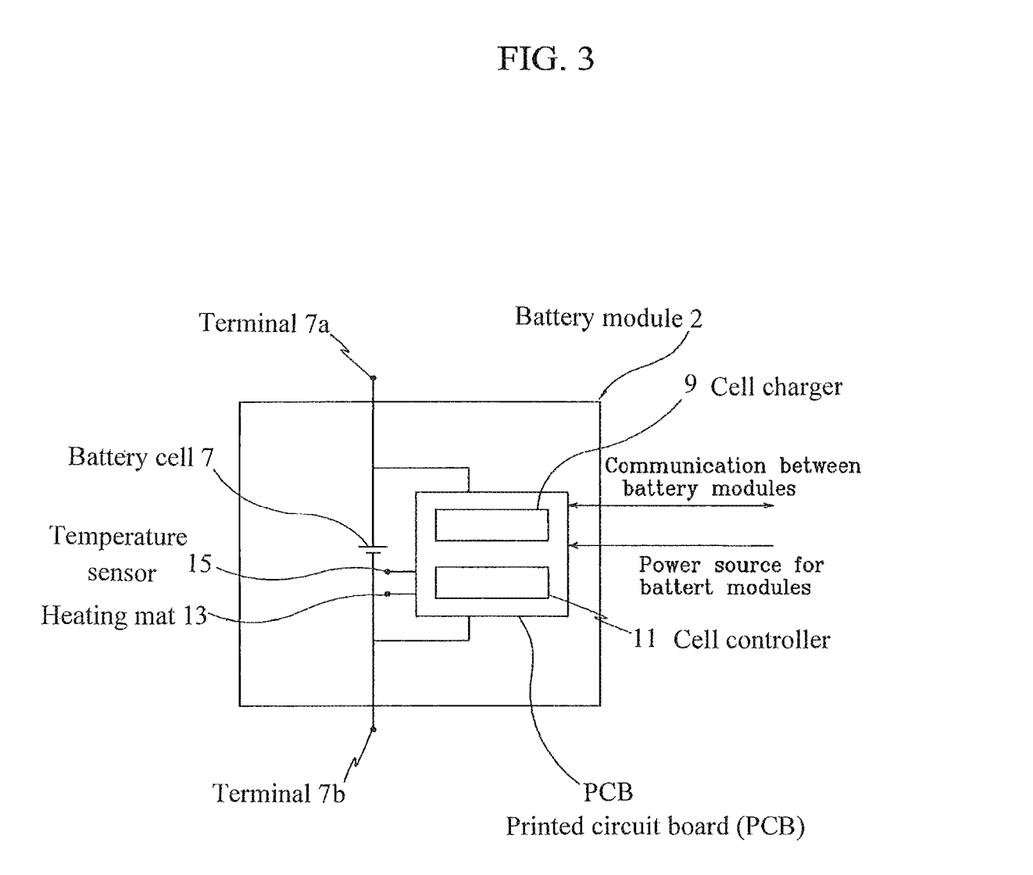
FIG. 3 is a schematic diagram showing the battery module according to an exemplary embodiment of the present invention.
Figure 4:
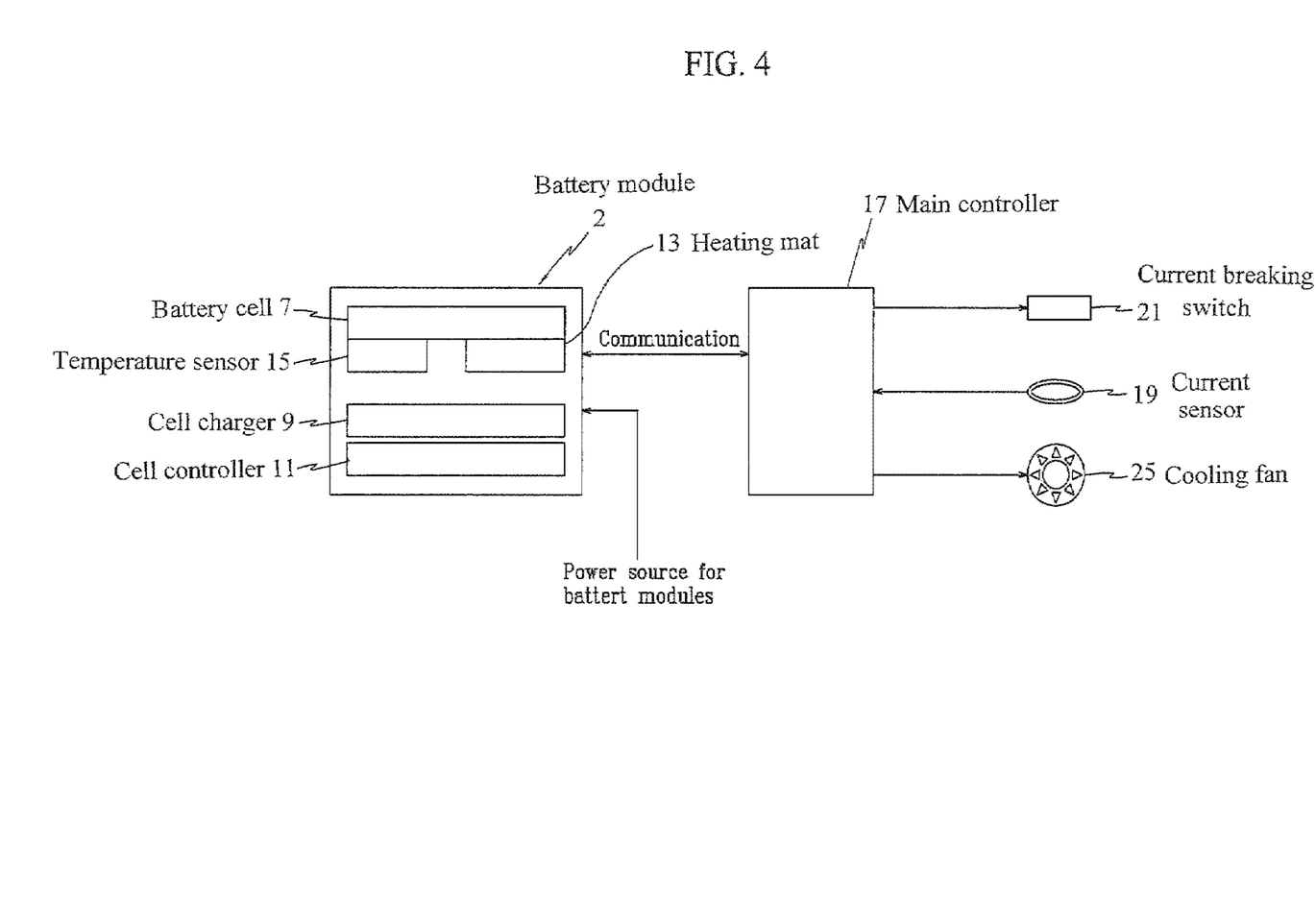
FIG. 4 is a block diagram of the battery module according to an exemplary embodiment of the present invention.

The cell charger 9 and the cell controller 11, as shown in FIGS. 3 and 4, can be coupled to a printed circuit board (PCB) or can be provided in the form of a chip. The cell charger 9 functions to charge the battery cell 7. The cell charger 9 preferably corresponds to one battery cell 7.

The cell controller 11 can control a corresponding cell charger 9. Further, the heating mat 13 and the temperature sensor 15 are electrically connected to the cell controller 11. That is, the cell controller 11 can receive a value measured by the temperature sensor 15 and control the heating mat 13. A connector 11a (refer to FIG. 2) is provided in the printed circuit board (PCB) in which the cell controller 11 is provided. The cell controller 11 is electrically connected to the temperature sensor 15 through the connector 11a.

The number of cell controllers 11 preferably corresponds to the number of battery modules 2. Further, a communication connector 11b connected to a main controller 17 (refer to FIGS. 5 to 7) (i.e., a battery management system (BMS) is provided in the printed circuit board (PCB) in which the cell controller 11 is provided. Accordingly, the cell controller 11 can send and receive data to and from the main controller 17 through the communication connector 11b.

The temperature sensor 15 can measure the temperature of the battery cell 7 and send a measured value to the cell controller 11 or the main controller 17.

When the temperature of the battery cell 7 is low, the heating mat 13 can be controlled by the cell controller 11 in order to raise the temperature of the battery cell 7. The heating mat 13, as shown in FIGS. 1 and 2, preferably is configured to surround the battery cell 7 or provided in one side of the battery cell 7.

Meanwhile, the battery module 2 can be supplied with a power source for driving the elements of the battery module 2.

Figure 6:
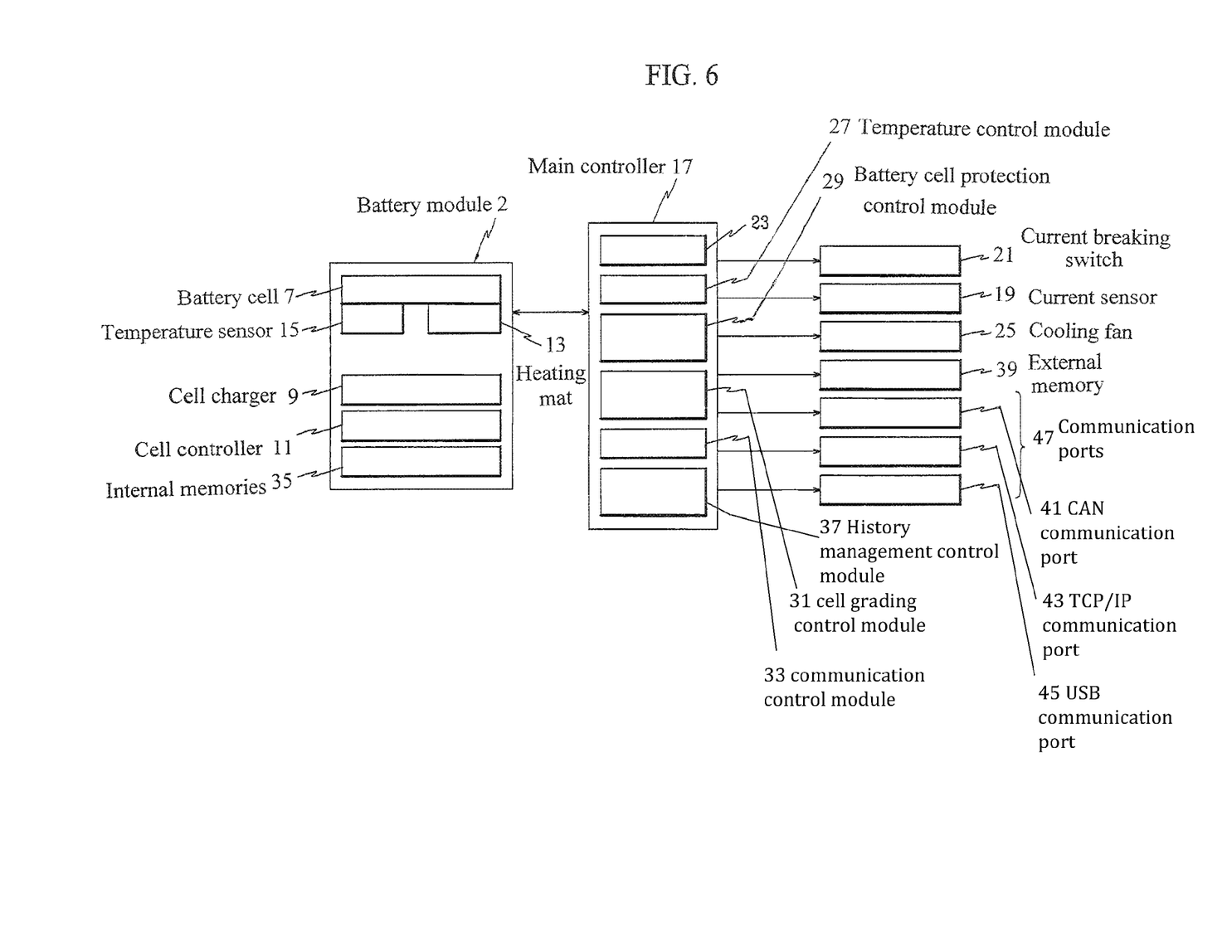
FIG. 6 is a schematic diagram showing a program control module included in the battery management system in order to describe an exemplary embodiment of the present invention.
Figure 7:
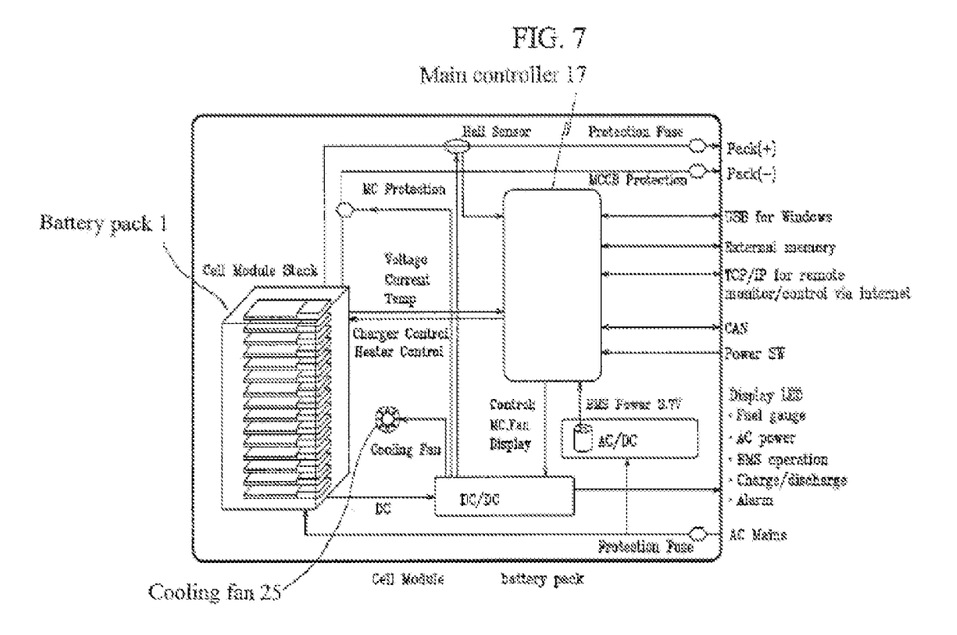
FIG. 7 is a schematic diagram showing an example of the battery management system to which an exemplary embodiment of the present invention is applied.

FIG. 6 is a diagram illustrating an exemplary embodiment of the present invention and is a block diagram showing the main elements of the battery management system. Referring to FIG. 6, the battery modules 2 of the present invention are electrically connected to each other and connected to each other so that they can be controlled by the respective main controllers 17.

To the main controller 17 are electrically connected a current sensor 19 for sensing current coming from the battery pack 1 and a current breaking switch 21 for breaking current coming from the battery pack 1.

The current breaking switch 21 preferably includes elements suitable for power control, such as a number of insulated gate bipolar transistors (IGBT) or power FETs which are coupled in parallel and are capable of controlling high power.

The main controller 17, as shown in FIG. 6, includes a charging control module 23 for receiving information about a state of charge (SOC) of each of the battery cells 7 from the cell controllers 11 and controlling each of the cell chargers 9 based on the information.

The charging control module 23 is a control program for controlling the cell chargers 9. The charging control module 23 can receive data, such as a voltage and a charging current of the battery cell 7, from the cell controller 11, analyze the received data, and send a charging command to the cell charger 9 if the battery cell 7 needs to be charged.

The main controller 17 further includes a temperature control module 27. The temperature control module 27 receives signals corresponding to values measured by the temperature sensors 15 and controls the heating mats 13 or the cooling fan 25 for controlling the temperature of the battery cells 7. The cooling fan 25 is installed in the casing 3 and it can function to lower the general temperature of the battery pack 1.

The temperature control module 27 is a control program for appropriately maintaining the temperature of the battery cells 7.

The main controller 17 includes a battery cell protection control module 29 for controlling the current breaking switch 21 in response to an input signal from the current sensor 19. The battery cell protection control module 29 is a control program capable of protecting the battery cells 7 from overcurrent or overcharging.

The main controller 17 further includes a cell grading control module 31. The cell grading control module 31 performs a cell grading process of checking the capacities of the battery cells 7 based on signals received from the respective cell controllers 11 and determining whether the battery cells 7 are appropriate.

The cell grading control module 31 is a control program for performing the cell grading process for the battery cells 7.

The cell grading control module 31 can determine the remaining life span of the battery cells 7 by calculating the life span of the battery cells 7 based on respective signals received from the cell controllers 11. If the cell grading control module 31 determines that a specific battery cell 7 is inappropriate and run down, the battery module 2 including the corresponding battery cell 7 can be removed or replaced, thereby prolonging the life span of the battery pack 1.

In this description, for convenience' sake, the cell grading process is illustrated to determine a state of charge (SOC), a state of health (SOH), etc. of the battery cell.

The main controller 17 further includes a communication control module 33 for sending data, related to the battery cells 7 and received from the cell controllers 11, and data processed in relation to the data to an external memory 39 or for communicating the data with an external computer.

Figure 5:
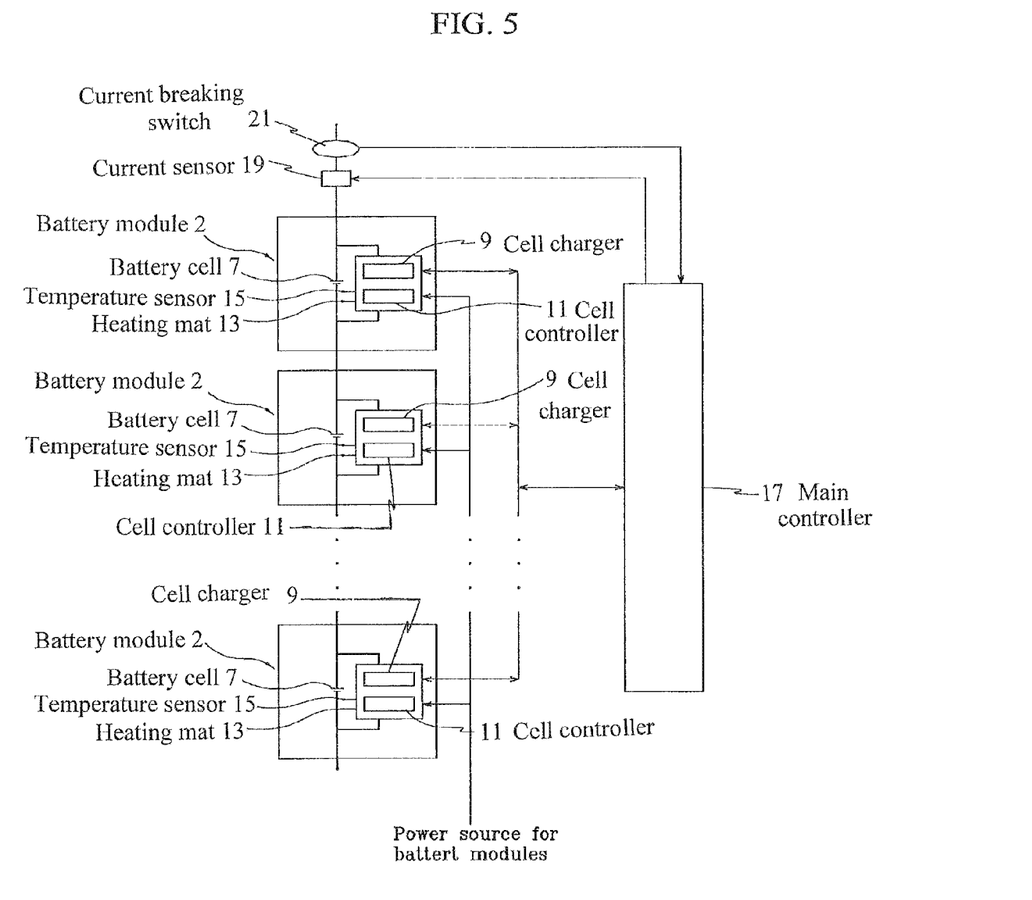
FIG. 5 is a schematic diagram showing a connection relationship between a plurality of the battery modules and a battery management system (BMS) in order to describe an exemplary embodiment of the present invention.

The communication control module 33 is a control program capable of sending and receiving data to and from an external device, such as a computer device. Meanwhile, the main controller 17, as shown in FIG. 5, includes communication ports 47, such as a CAN communication port 41, a TCP/IP communication port 43, and a USB communication port 45. The communication ports 47 can exchange data with the external computer device in various ways under the control of the communication control module 33.

Further, internal memories 35 (refer to FIG. 6) are connected to the respective cell controllers 11. The main controller 17 further includes a history management control module 37 for recording and managing the history of each of the battery cells 7 in the respective internal memories 35.

The history management control module 37 functions to manage data, such as the history of the past of each of the battery cells 7 so that the battery pack 1 can be managed in an optimal state.

The operation and function of the battery pack 1 configured as above according to an exemplary embodiment of the present invention is described in detail below.

First, a worker inserts the battery modules 2, included in the battery cell 7, into the guide slots 3b provided in the casing 3 and couples the battery modules 2 to the casing 3 using the fastening members 16, such as screws.

Next, the worker inserts the extension portions 5a, provided on both sides of each of the trays 5 constituting the battery modules 2, into the guide slots 3b. Next, the worker couples the trays 5 to the casing 3 using the fastening members 16, such as screws. As described above, since the battery modules 2 are sequentially inserted into the casing 3 and fastened thereto using the fastening members 16, the battery pack 1 of an assembly form can be completed.

The number of battery modules 2 connected to the battery pack 1 can be different according to a necessary capacity of power in order to appropriately control the capacity of the battery pack 1 as occasion demands.

Further, a control process through the main controller 17 according to an exemplary embodiment of the present invention is described below.

The cell controller 11 checks a voltage, a charging current, etc. of the battery cell 7. Further, the temperature sensor 15 senses the temperature of the battery cell 7 and sends the sensed temperature to the cell controller 11. Further, the cell controller 11 stores information about the battery cell 7 in the internal memory 35 and simultaneously sends the information to the main controller 17.

Further, the current sensor 19 senses the current of the battery pack 1 and sends the sensed current to the main controller 17.

The main controller 17 inputs information about the battery cell 7 to the external memory 39 through the communication control module 33. Further, the main controller 17 can load information about the battery cell 7, stored in the external memory 39.

The main controller 17 sends a signal to a corresponding cell controller 11 if it determines that a corresponding battery cell 7 needs to be charged based on the information about the corresponding battery cell 7 and the data received from the current sensor 19. In response to the signal, the cell controller 11 controls a corresponding cell charger 9 so that it charges the corresponding battery cell 7.

The temperature control module 27 of the main controller 17 sends a control signal to the cell controller 11 when the temperature of a specific battery cell 7 has a set value or less. In response to the control signal, the cell controller 11 operates the heating mat 13 in order to raise the temperature of the specific battery cell 7.

Further, when the temperature of the battery cells 7 is higher than a set value or more, the temperature control module 27 of the main controller 17 operates the cooling fan 25. When the cooling fan 25 is operated as described above, the temperature of the battery cells 7 is generally lowered.

If the battery cell protection control module 29 of the main controller 17 determines that a specific battery cell 7 has been overdischarged or overcharged or the temperature of the battery cell 7 has exceeded a normal range based on the data received from a corresponding cell controller 11, it operates the current breaking switch 21 in order to protect the battery pack 1.

Meanwhile, the cell grading control module 31 of the main controller 17 can pick out an inappropriate battery module 2 by checking the capacity of a corresponding battery cell 7, received from the cell controller 11. Accordingly, the worker can remove the inappropriate battery module 2 from the casing 3 and install an appropriate battery module 2 in the casing 3. Consequently, since a battery cell grading process can be performed in a process of manufacturing the battery pack 1, the battery pack 1 with an excellent quality can be fabricated.

Further, the cell grading control module 31 calculates the life span of the battery cell 7 based on the data received from the cell controller 11. Accordingly, the general life span of the battery pack 1 can be prolonged by replacing the battery module 2, including a run-down battery cell 7, with the battery module 2 including a new battery cell 7.

The signals sent to the main controller 17 can be stored in the external memory 39 through the communication control module 33.

In particular, the history management control module 37 of the main controller 17 databases the histories of the battery modules 2 and stores and manages the data.

In accordance with the exemplary embodiments of the present invention, a process of manufacturing the battery pack can be simplified and the manufacturing cost can be reduced because battery cell-balancing needs not to be performed through additional processes.

FIGS. 8 to 10 are exemplary photographs to which the exemplary embodiments of the present invention are applied.

<Description of symbols>

1. battery pack,
2. battery module,
3. casing,
3a. opening,
3b. guide slot,
5. tray,
7a., 7b. terminal,
9. cell charger,
11. cell controller,
11a., 11b. connector,
13. heating mat,
15. temperature sensor,
17. main controller,
19. current sensor,
21. current breaking switch,
23. charging control module,
25. cooling fan,
27. temperature control module,
29. battery cell protection control module,
31. cell grading control module,
33. communication control module,
35. internal memory,
37. history management control module,
39. external memory, While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A battery pack comprising:
a casing configured to include a reception space;
trays coupled to the casing at regular intervals;
battery cells provided in the respective trays;
cell chargers respectively configured to charge the battery cells, and at least one of the cell charger provided in each tray;
cell controllers respectively configured to control the cell chargers and provided in each tray, wherein each of the cell controllers independently controls their respective cell charger(s) to charge the battery cells;

heating mats coupled to the respective battery cells; and temperature sensors respectively provided in the trays and configured to sense temperatures of the battery cells.

2. The battery pack of claim 1, wherein the casing is equipped with guide slots having faced each other in pairs at regular intervals and having the trays fit and inserted into the guide slots, and the trays each are equipped with extension portions, the extension portions provided on both sides of the tray and inserted into the guide slots.

3. The battery pack of claim 1, wherein the trays each are fastened to the casing using fastening members.

4. The battery pack of claim 1, wherein the cell controllers are equipped with a communication connector connected to a main controller and configured to exchange data with the main controller.

5. The battery pack of claim 1, wherein the cell controllers are connected to a main controller, wherein each cell controller is connected to one of the cell chargers, and wherein each cell charger is connected to one of the battery cells.

6. The battery pack of claim 5, wherein each battery cell is charged by its respective cell charger, wherein a charge of each cell charger is controlled by its respective cell controller, and wherein the cell controllers are controlled by a main controller.

7. The battery pack of claim 1, wherein the battery cells comprise a first and a second battery cell, wherein the cell chargers comprise a first and a second cell charger, and wherein the cell controllers comprise a first and a second cell controller, and wherein:

a first charge is sent to the first battery cell by the first cell charger and wherein the first charge is set by the first cell controller, a second charge is sent to the second battery cell by the second cell charger and wherein the second charge is set by the second cell controller, and the first charge is a different amount than the second charge.

8. The battery pack of claim 7, wherein the first charge and the second charge are determined by a main controller, and wherein the main controller controls the first charge to the first controller via a first communication connector and the main controller controls the second charge to the second controller via a second communication connector.

9. The battery pack of claim 8, wherein the temperature sensors provides a set of temperature measurements to the main controller by an electrical connection through a set of communication connectors, wherein the main controller controls the charges based on the set of temperature measurements, and wherein the set of communication connectors comprise the first communication connector and the second communication connector.

10. The battery pack of claim 1, wherein each one of the cell chargers and the respective cell controller for controlling the charge of one of the battery cells are both in a chip or coupled to a printed circuit board.

11. A battery management system, comprising:

a battery pack, comprising a casing configured to include a reception space, trays coupled to the casing at regular intervals, battery cells provided in the respective trays, cell chargers respectively configured to charge the battery cells, and at least one of the cell chargers provided in each tray, cell controllers respectively configured to control the cell chargers and provided in each tray, wherein each of the cell controllers independently controls their respective cell charger(s) to charge the battery cells, heating mats coupled to the respective battery cells, and temperature sensors respectively provided in each tray and configured to sense temperatures of the battery cells; and a main controller comprising a charging control module for receiving information about a state of charge (SOC) of each of the battery cells from the cell controllers and for controlling each of the cell chargers.

12. The battery management system of claim 11, wherein the main controller further comprises a temperature control module for receiving signals corresponding to values measured by the temperature sensors and for controlling heating mats or a cooling fan for controlling a temperature of the battery cells.

13. The battery management system of claim 11, wherein the main controller further comprises a battery cell protection control module connected to a current sensor for sensing currents of the battery cells and a current breaking switch for breaking the currents of the battery cells and configured to control the current breaking switch based on a signal received from the current sensor.

14. The battery management system of claim 13, wherein the main controller controls the current breaking switch based on the signal received from the current sensor in combination with a set of temperature measurements for the battery cells.

15. The battery management system of claim 14, wherein each of the cell controllers are electrically connected to a temperature sensor of the respective battery cell.

16. The battery management system of claim 11, wherein the main controller further comprises a cell grading control module configured to perform cell grading for determining an inappropriate battery cell by determining a state of charge (SOC) and a state of health (SOH) of each of the battery cells in response to each of signals received from the cell controllers.

17. The battery management system of claim 16, wherein the cell grading control module is further configured to determine a remaining life span of the battery cell by calculating a life span of the battery cell based on the signal received from the cell controller.

18. The battery management system of claim 11, wherein the main controller comprises a communication control module configured to send data pertinent to the battery cells, received from the cell controllers, and data processed in relation to the data, received from the cell controllers, to an external memory and to communicate the data to an external computer.

19. The battery management system of claim 11, wherein the main controller comprises a CAN communication port, a TCP/IP communication port, and a USB communication port.

20. The battery management system of claim 11, wherein internal memories are connected to the respective cell controllers, and the main controller comprises a history management control module for recording histories of the battery cells in the respective internal memories and managing the histories.

* * * * *